US008931503B2

(12) United States Patent
Walkowski

(10) Patent No.: US 8,931,503 B2
(45) Date of Patent: Jan. 13, 2015

(54) FUEL INLET VALVE WITH INTEGRAL LINE

(75) Inventor: Paul Douglas Walkowski, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 399 days.

(21) Appl. No.: 13/114,140

(22) Filed: May 24, 2011

(65) Prior Publication Data

US 2012/0298228 A1    Nov. 29, 2012

(51) Int. Cl.
*B67D 7/72* (2010.01)
*F04F 1/00* (2006.01)
*F04F 1/18* (2006.01)
*F16K 24/00* (2006.01)
*E03B 11/00* (2006.01)
*F17D 1/00* (2006.01)
*B60K 15/04* (2006.01)

(52) U.S. Cl.
CPC ..................................... *B60K 15/04* (2013.01)
USPC ............ 137/212; 137/209; 137/588; 137/590

(58) Field of Classification Search
USPC .................. 137/212, 209, 571, 588, 583, 590;
141/350, 325, 302; 138/109, 177, 178;
285/124.3, 124.2, 124.4, 124.1, 136.1,
285/141.1, 901; 220/562, 4.14, 4.13, 729,
220/86.1, 86.2
See application file for complete search history.

(56) References Cited

U.S. PATENT DOCUMENTS

| 817,470 | A | * | 4/1906 | Cole et al. .................. 73/861.65 |
| 2,406,373 | A | * | 8/1946 | Heigis .......................... 220/88.3 |
| 2,701,147 | A | * | 2/1955 | Summerville ..................... 285/1 |
| 3,500,858 | A | * | 3/1970 | Metcalf ......................... 137/560 |
| 3,512,806 | A | * | 5/1970 | Fullmer et al. ............. 285/124.4 |
| 4,216,792 | A | * | 8/1980 | Siminovich ................... 137/209 |
| 4,310,013 | A | * | 1/1982 | McClaskey ................... 137/145 |
| 4,367,769 | A | * | 1/1983 | Bain .............................. 138/114 |
| 5,386,843 | A | * | 2/1995 | Church ......................... 137/202 |
| 5,427,074 | A | * | 6/1995 | Tuckey ......................... 123/514 |
| 5,687,762 | A | * | 11/1997 | Teets et al. .................... 137/588 |
| 5,960,816 | A | | 10/1999 | Mills |
| 6,206,228 | B1 | * | 3/2001 | Roth ............................. 220/601 |
| 6,227,264 | B1 | * | 5/2001 | Schenk, Jr. ...................... 141/95 |
| 6,234,195 | B1 | | 5/2001 | Kippe et al. |
| 6,293,304 | B1 | * | 9/2001 | Broberg ........................ 137/588 |

U.S. PATENT DOCUMENTS

| 6,669,043 | B2 | * | 12/2003 | Fish et al. .................... 220/4.14 |
| 7,219,693 | B2 | * | 5/2007 | Alex et al. ..................... 137/588 |
| 2008/0185491 | A1 | * | 8/2008 | Bosch et al. ............... 248/346.5 |

FOREIGN PATENT DOCUMENTS

EP    1122114 A2    8/2001

OTHER PUBLICATIONS

European Patent Office, International Search Report and Written Opinion in corresponding PCT/US2012/039398. Date of Mailing: Sep. 11, 2012.

* cited by examiner

*Primary Examiner* — Craig Schneider
*Assistant Examiner* — Hailey K Do
(74) *Attorney, Agent, or Firm* — Dykema Gossett PLLC

(57) ABSTRACT

A fuel inlet valve for a fuel tank includes a flange that is attachable to the fuel tank and a first aperture and a second aperture formed in the flange. The fuel inlet valve also includes a fuel valve associated with the first aperture and a fill pipe nipple associated with the first aperture. The fuel valve and the fill pipe nipple form a fuel path through the first aperture. The fuel inlet valve also has at least one nipple associated with the second aperture and connectable to said at least one nipple is connectable to a purge line, a fuel pump, or a fuel line.

23 Claims, 2 Drawing Sheets

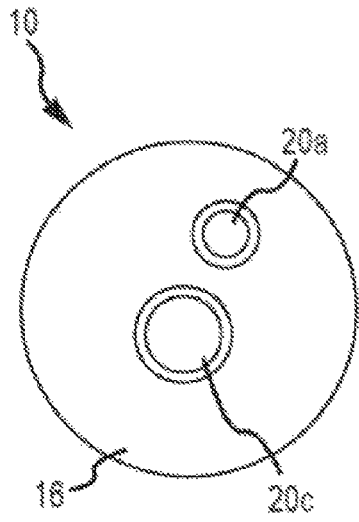
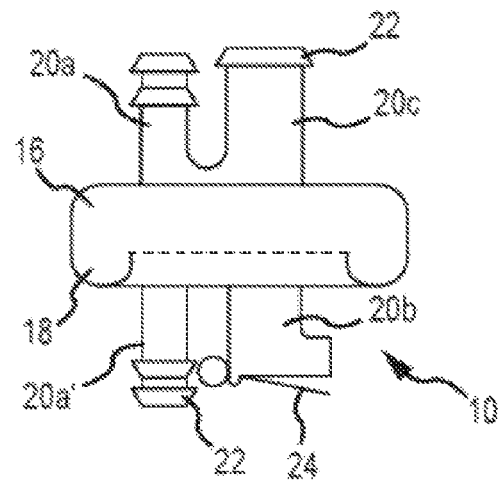
FIG.1A  FIG.1B
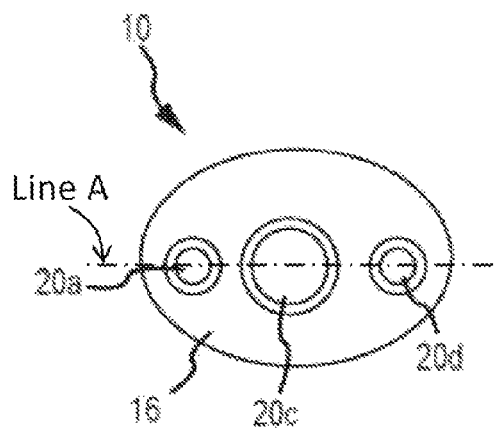
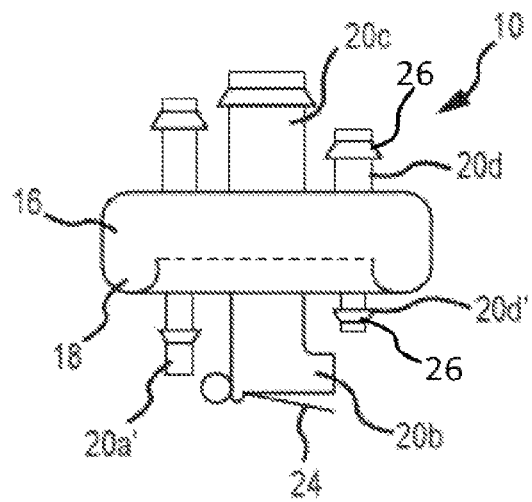
FIG.2A  FIG.2B

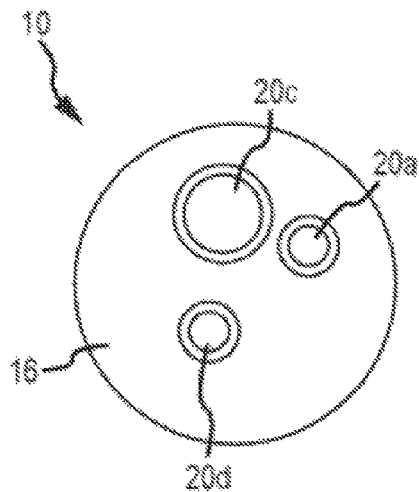
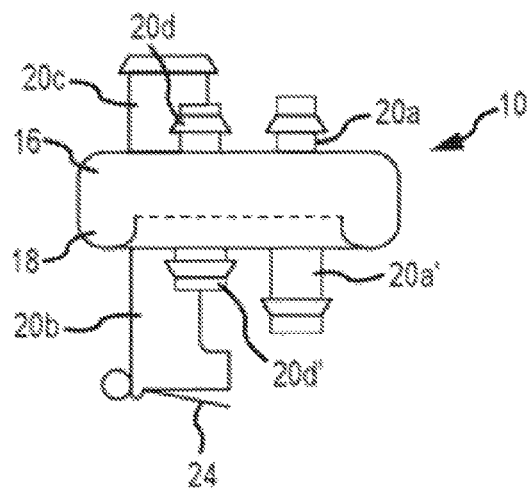
FIG.3A
FIG.3B
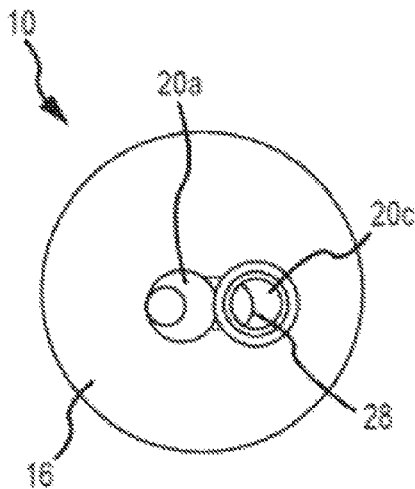
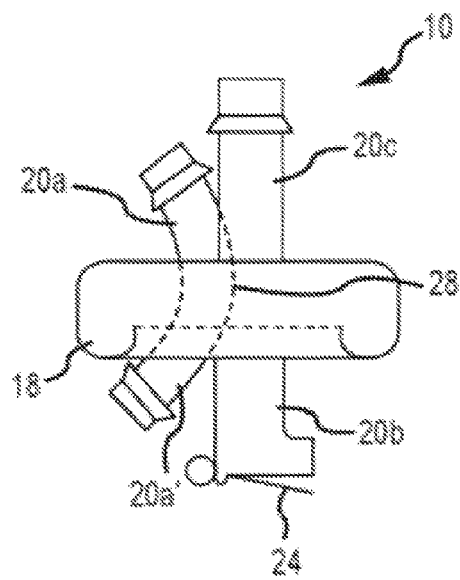
FIG.4A
FIG.4B

US 8,931,503 B2

FUEL INLET VALVE WITH INTEGRAL LINE

TECHNICAL FIELD

The present invention relates to a fuel inlet valve that covers an opening in a fuel tank, and more particularly to a fuel inlet valve containing multiple apertures associated with components in a fuel emissions system.

BACKGROUND OF THE INVENTION

A vehicle fuel emissions system may include multiple components, such as valves, disposed inside a fuel tank and vented outside the tank through corresponding apertures through the fuel tank. The fuel tank may also include additional apertures corresponding to, for example, fuel lines, purge nipples, ports, and other system components.

To minimize emissions, the system should have a low level of permeability to both liquid fuel and fuel vapor. Each opening, or "penetration," formed in the fuel tank to accommodate the apertures also creates a permeation path, and the permeability of the fuel tank increases as the number of permeation paths increase. Thus, it is desirable to reduce the number of fuel tank penetrations, especially in view of the particularly strict emissions requirements for Partial Zero Emissions Vehicles (PZEV) and Ultra Low Emissions Vehicles (ULEV). On the other hand, there still needs to be a sufficient number of fuel tank penetrations to accommodate all of the apertures needed to link the fuel tank with the other components in the emissions system.

There is a desire for an arrangement that can provide multiple apertures to accommodate multiple components in the fuel system without increasing the permeability of the fuel tank.

SUMMARY OF THE INVENTION

A fuel inlet valve for a fuel tank according to one embodiment may include a flange that is attachable to the fuel tank and a first aperture and a second aperture formed in the flange. The inlet valve may also include a fuel valve associated with the first aperture and a fill pipe nipple associated with the first aperture. The fuel valve and the fill pipe nipple may form a fuel path through the first aperture. The inlet valve may also have at least one nipple associated with the second aperture and connectable to said at least one nipple is connectable to a purge line, a fuel pump, or a fuel line.

A fuel inlet valve for a fuel tank according to another embodiment may include a flange that is attachable to the fuel tank and an aperture formed in the flange. A fuel valve and a fill pipe nipple may both be associated with the first aperture to form a fuel path through the first aperture. The inlet valve may also include at least one purge nipple extending at an angle from a base of the fuel pipe nipple.

BRIEF DESCRIPTION OF THE DRAWINGS

FIGS. 1A and 1B are top and side views, respectively, of a fuel inlet valve according to one embodiment of the invention;

FIGS. 2A and 2B are top and side views, respectively, of a fuel inlet valve according to another embodiment of the invention;

FIGS. 3A and 3B are top and side views, respectively, of a fuel inlet valve according to yet another embodiment of the invention;

FIGS. 4A and 4B are top and side views, respectively, of a fuel inlet valve according to a further embodiment of the invention.

DETAILED DESCRIPTION OF THE INVENTION

FIGS. 1A and 1B illustrate a fuel inlet valve 10 according to one embodiment of the invention. The inlet valve 10 covers an opening or penetration in a fuel tank (not shown). The opening forms a permeation path that is closed by the inlet valve 10 to block the passage of liquid fuel and fuel vapor through the opening. The inlet valve 10 acts as an attachment point for fuel emissions system components, including but not limited to fuel lines, valves, and purge nipples. In the examples described below, the inlet valve 10 will be described with respect to an in-line check valve (ICV), a purge nipple, and a fuel line, but those of ordinary skill in the art will understand that the inlet valve 10 can connect with any other component in the fuel emissions system without departing from the scope of the invention.

The inlet valve 10 of FIGS. 1A and 1B has a flange 16 that attaches to the fuel tank through any known means, such as through welding, chemical bonding, mechanical interlocking, or adhesive. The inlet valve 10 may be configured to be either permanently attached to the fuel tank (e.g., through welding) or removably attached to the fuel tank (e.g., through mechanical interlocking). An optional weld foot 18 may be formed on the flange 16 to aid connection between the inlet valve 10 and the fuel tank. The specific material used to make the flange 16 may depend on the type of fuel tank that the inlet valve 10 will attach to. For example, the flange 16 may be made of a plastic that can be attached to a plastic fuel tank. Alternatively, flange 16 may be cast from metal so that it can easily attached to a metal fuel tank.

The flange 16 may have any appropriate shape, such as a round or oval shape, depending on the configuration of other elements in the inlet valve 10 as described in greater detail below.

In the embodiment shown in FIGS. 1A and 1B, the flange 16 may have two apertures, one associated with one or more purge nipples 20a, 20a' and another associated with an in-line check valve (ICV) 20b. The inlet valve 10 may include two purge nipples 20a aligned with each other, with one purge nipple 20a to be disposed inside the fuel tank and another purge nipple 20a' to be disposed outside the fuel tank. The purge nipples 20a, 20a' may have one more barbs 22 to provide a secure connection with a purge line (not shown).

The ICV 20b may have or be associated with a fill pipe nipple 20c to allow connection of a fill pipe (not shown). In this embodiment, the ICV 20b is also connected to the fuel line nipple 20c disposed outside the tank, thereby creating a fuel path. The fill pipe nipple 20c may also have an associated barb 22 to provide a more secure connection. The ICV 20b itself may have any configuration that allows it to act as a check valve. The ICV 20b shown in the Figures includes a flapper 24 to be disposed inside the fuel tank, but the ICV 20b may have other closure mechanisms without departing from the scope of the invention.

Since the purge nipples 20a, 20a' and the ICV 20b are both disposed in the same flange 16, the flange 16 provides two apertures associated with three elements (i.e., the purge nipples 20a, 20a', the ICV 20b, and the fill pipe nipple 20c) while allowing only one opening/penetration 16 in the fuel tank. As a result, the inlet valve 10 provides multiple apertures through the fuel tank without increasing the number of fuel tank openings 16 that could increase the permeability of the fuel tank.

FIGS. 2A and 2B illustrate another embodiment of the inventive inlet valve 10. In this embodiment, the flange 16 has an additional aperture corresponding to two fuel line nipples 20d, 20d' that provide a connection to a fuel pump (not shown) inside the fuel tank and a fuel delivery line (not shown) outside the fuel tank. A quick connect fitting 26 may be included on at least one of the fuel line nipples 20d, 20d'. In this embodiment, purge nipples 20a, 20a', the ICV 20b and fill pipe nipple 20c, and the fuel line nipples 20d, 20d' may be arranged so that the centers of their corresponding apertures are aligned with each other along a line A. To accommodate this orientation, the flange 16 may have a oval shape as shown in FIGS. 2A and 2B, but other aperture orientations and flange shapes may be used without departing from the scope of the invention. For example, as shown in FIGS. 3A and 3B, the centers of the apertures corresponding to the purge nipples 20a, 20a', the ICV 20b and fill pipe nipple 20c, and the fuel line nipples 20d, 20d' are arranged in a triangular pattern and the flange may have a circular shape, creating a more compact footprint.

FIGS. 4A and 4B illustrate a further embodiment of the inventive inlet valve 10. In this embodiment, the ICV 20b is oversized so that the cross-section of the ICV 20b is also large enough to allow adequate flow during refueling. In this embodiment, the ICV 20b is also connected to the fuel line nipple 20c disposed outside the tank, thereby creating a single fuel path like in the other embodiments. Also, in this embodiment, the purge nipples 20a, 20a' are angled and extend from the base of the fill pipe nipple 20c. The angle may be selected to still allow enough room to easily connect hoses or other components to the purge nipples 20a, 20a'. In one embodiment, the purge nipples 20a, 20a' extend from the base of the fuel line nipple 20c at approximately a 45-degree angle.

Note that although the embodiment of FIGS. 4A and 4B does not show fuel line nipples 20d, 20d', they may also be included in this embodiment without departing from the scope of the invention. Also, the flange 16 in this embodiment may have only one aperture that is shared by the ICV 20b, the fuel line nipple 20c, and the purge nipples 20a, 20a'. Alternatively, the flange 16 may have more than one opening like the other embodiments to accommodate the ICV 20b, the fuel line nipple 20c, and the purge nipples 20a, 20a'.

The purge nipples 20a, 20a' together may form an elbow 28, creating a curved purge path. A portion of the elbow 28 may extend into the fuel path formed by the ICV 20b and the fill pipe nipple 20c, as shown in FIG. 4A. By disposing both the ICV 20b and the fuel line nipple 20c in the same fuel path and angling the purge nipples 20a, 20a' from the base of the fill pipe nipple 20c, the flange 16 can be even smaller than the flange 16 in the other embodiments. Moreover, this embodiment provides multiple apertures while using minimum number of fuel tank penetrations, thereby minimizing the permeability of the inlet valve 10 and thus the overall emissions system.

While the best modes for carrying out the invention have been described in detail, those familiar with the art to which this invention relates will recognize various alternative designs and embodiments for practicing the invention within the scope of the appended claims.

What is claimed is:

1. A fuel inlet valve for a fuel tank, comprising:
a flange configured to be attachable to the fuel tank;
a first aperture and a second aperture formed in the flange;
a fuel valve integral with the flange and in fluid communication with the first aperture, wherein the fuel valve is an in-line check valve having a flapper;
a fill pipe nipple integral with the flange and in fluid communication with the first aperture, wherein the fuel valve and the fill pipe nipple form a fuel path through the first aperture; and
at least one nipple integral with the flange and in fluid communication with the second aperture, wherein said at least one nipple forms a second path which extends through the second aperture, and said at least one nipple intersects the fill pipe nipple.

2. The fuel inlet valve of claim 1, wherein said at least one nipple is connectable to at least one of a purge line, a fuel pump, and a fuel line.

3. The fuel inlet valve of claim 1, wherein said at least one nipple comprises a fuel line nipple.

4. The fuel inlet valve of claim 1, further comprising at least one barb disposed on at least one nipple.

5. The fuel inlet valve of claim 1, further comprising at least one quick connect fitting disposed on at least one nipple.

6. The fuel inlet valve of claim 1, wherein said at least one nipple extends from the flange at an angle relative to the fill pipe nipple.

7. The fuel inlet valve of claim 1, wherein said at least one nipple intersects the fill pipe nipple at an angle relative to the flange.

8. The fuel inlet valve of claim 1, wherein said at least one nipple defines a curved path that is disposed in a portion of the fuel path between the fuel valve and the fill pipe nipple.

9. The fuel inlet valve of claim 1, further comprising a third aperture,
wherein said at least one nipple is integral with the flange and in fluid communication with the second aperture and includes first and second purge nipples connectable with the purge line, wherein the first purge nipple is disposed inside the fuel tank and the second purge nipple is disposed outside the fuel tank, and
further comprising a fuel line nipple integral with the flange and in fluid communication with the third aperture.

10. The fuel inlet valve of claim 9, wherein the first, second, and third apertures each have a center, and wherein the centers of the first, second, and third apertures are disposed along a line.

11. The fuel inlet valve of claim 9, wherein the first, second, and third apertures each have a center, and wherein the centers of the first, second, and third apertures are disposed in a triangle.

12. The fuel inlet valve of claim 1, wherein said at least one nipple includes first and second purge nipples connectable with a purge line, wherein the first purge nipple is disposed inside the fuel tank and the second purge nipple is disposed outside the fuel tank.

13. The fuel inlet valve of claim 12, wherein the first and second purge nipples meet at a base of the fill pipe nipple to form an elbow.

14. The fuel inlet valve of claim 13, wherein the elbow is disposed in a portion of the fuel path between the fuel valve and the fill pipe nipple.

15. A fuel inlet valve for a fuel tank, comprising:
a flange configured to be attachable to the fuel tank;
an aperture formed in the flange;
a fuel valve integral with the flange and in fluid communication with the aperture, wherein the fuel valve is an in-line check valve having a flapper;
a fill pipe nipple integral with the flange and in fluid communication with the aperture, wherein the fuel valve and the fill pipe nipple form a fuel path through the aperture; and at least one purge nipple integral with the flange and in fluid communication with the aperture and forming a second path through the aperture, wherein said at least one purge nipple extends from the flange at an acute angle relative to the fill pipe nipple, and said at least one purge nipple intersects the fill pipe nipple.

16. The fuel inlet valve of claim 15, wherein said at least one purge nipple intersects the fill pipe nipple at an angle relative to the flange.

17. The fuel inlet valve of claim 15, wherein said at least one purge nipple defines a curved path that is disposed in a portion of the fuel path between the fuel valve and the fill pipe nipple.

18. The fuel inlet valve of claim 15, wherein said at least one purge nipple comprises first and second purge nipples, and wherein the first and second purge nipples meet at the base of the fill pipe nipple to form an elbow.

19. The fuel inlet valve of claim 18, wherein the elbow extends into a portion of the fuel path between the fuel valve and the fill pipe nipple.

20. A fuel inlet valve for a fuel tank, comprising:
a flange configured to be attachable to the fuel tank;
a first aperture and a second aperture formed in the flange;
a fuel valve integral with the flange and in fluid communication with the first aperture;
a fill pipe nipple integral with the flange and in fluid communication with the first aperture, wherein the fuel valve and the fill pipe nipple form a fuel path through the first aperture; and
at least one nipple integral with the flange and in fluid communication with the second aperture,
wherein said at least one nipple includes first and second purge nipples connectable with a purge line, wherein the first purge nipple is disposed inside the fuel tank and the second purge nipple is disposed outside the fuel tank; the first and second purge nipples meet at a base of the fill pipe nipple to form an elbow; and the elbow extends into a portion of the fuel path between the fuel valve and the fill pipe nipple.

21. A fuel inlet valve for a fuel tank, comprising:
a flange configured to be attachable to the fuel tank;
an aperture formed in the flange;
a fuel valve integral with the flange and in fluid communication with the aperture;
a fill pipe nipple integral with the flange and in fluid communication with the aperture, wherein the fuel valve and the fill pipe nipple form a fuel path through the first aperture; and
at least one purge nipple integral with the flange and in fluid communication with the aperture and forming a second path through the aperture, wherein said at least one purge nipple extends at an acute angle from a base of the fill pipe nipple,
wherein said at least one purge nipple comprises first and second purge nipples; the first and second purge nipples meet at the base of the fill pipe nipple to form an elbow; and the elbow extends into a portion of the fuel path between the fuel valve and the fill pipe nipple.

22. A fuel inlet valve for a fuel tank, comprising:
a flange configured to be attachable to the fuel tank;
a first aperture and a second aperture formed in the flange;
a fuel valve integral with the flange and in fluid communication with the first aperture, wherein the fuel valve is an in-line check valve having a flapper;
a fill pipe nipple integral with the flange and in fluid communication with the first aperture, wherein the fuel valve and the fill pipe nipple form a fuel path through the first aperture; and
at least one nipple integral with the flange and in fluid communication with the second aperture, wherein said at least one nipple forms a second path which extends through the second aperture, and said at least one nipple defines a curved path that is disposed in a portion of the fuel path between the fuel valve and the fill pipe nipple.

23. A fuel inlet valve for a fuel tank, comprising:
a flange configured to be attachable to the fuel tank;
an aperture formed in the flange;
a fuel valve integral with the flange and in fluid communication with the aperture, wherein the fuel valve is an in-line check valve having a flapper;
a fill pipe nipple integral with the flange and in fluid communication with the aperture, wherein the fuel valve and the fill pipe nipple form a fuel path through the aperture; and
at least one purge nipple integral with the flange and in fluid communication with the aperture and forming a second path through the aperture, wherein said at least one purge nipple extends from the flange at an acute angle relative to the fill pipe nipple, and said at least one purge nipple defines a curved path that is disposed in a portion of the fuel path between the fuel valve and the fill pipe nipple.

* * * * *

UNITED STATES PATENT AND TRADEMARK OFFICE
CERTIFICATE OF CORRECTION

| | | |
|---|---|---|
| PATENT NO. | : 8,931,503 B2 | Page 1 of 1 |
| APPLICATION NO. | : 13/114140 | |
| DATED | : May 24, 2011 | |
| INVENTOR(S) | : Paul Douglas Walkowski | |

It is certified that error appears in the above-identified patent and that said Letters Patent is hereby corrected as shown below:

In The Claims

COLUMN 5, line 46 (Claim 21, line 8) delete "first".

Signed and Sealed this
Twelfth Day of May, 2015

Michelle K. Lee
*Director of the United States Patent and Trademark Office*